No. 12,336. REISSUED APR. 4, 1905.

A. H. KOPPERUD.

CULTIVATOR.

APPLICATION FILED MAY 3, 1904.

2 SHEETS—SHEET 1.

Witnesses.
Arthur F. Lee.
Walter F. Lane.

Inventor.
A. H. Kopperud
by N. A. Acker
his Atty.

PHOTO-LITHOGRAPHED BY SACHETT & WILHELMS LITHO. & PTG. CO. NEW YORK.

No. 12,336. REISSUED APR. 4, 1905.

A. H. KOPPERUD.

CULTIVATOR.

APPLICATION FILED MAY 3, 1904.

2 SHEETS—SHEET 2.

Witnesses.
Arthur L. Shee.
Walter F. Lane.

Inventor.
A. H. Kopperud
by M. A. Acker
his atty

PHOTO-LITHOGRAPHED BY SAC. ...TY & WILHELMS LITHO. & PTG. CO. NEW YORK.

No. 12,336. Reissued April 4, 1905.

UNITED STATES PATENT OFFICE.

ANDERS H. KOPPERUD, OF BYRON, CALIFORNIA, ASSIGNOR OF ONE-FOURTH TO ROY LESTER McCABE, OF BYRON, CALIFORNIA.

CULTIVATOR.

SPECIFICATION forming part of Reissued Letters Patent No. 12,336, dated April 4, 1905.

Original No. 708,150, dated September 2, 1902. Application for reissue filed May 3, 1904. Serial No. 206,181.

*To all whom it may concern:*

Be it known that I, ANDERS H. KOPPERUD, a citizen of the United States, residing at Byron, Contra Costa county, State of California, have invented certain new and useful Improvements in Cultivators; and I do hereby declare the following to be a full, clear, and exact description of the same.

The present invention relates to improvements in the general class of cultivators, but more particularly to what is known as "disk harrows." In this class of harrows the disks are commonly arranged upon a single axle extending crosswise of the frame or upon two axles arranged at an inclination to each other or V-shaped. With the first-mentioned arrangement the colter-disks cut in the same outward direction, which tends to work the harrow to one side or give a side draft thereto. Again, with this arrangement of the disk the field ofttimes requires reharrowing in order to obtain proper pulverization of the ground. With the second arrangement the colter-disks cut toward each other at an inward inclination, the inner ends of the axles approaching each other at the center of the harrow-frame. This arrangement of the colter-disks leaves a center ridge to the harrowed ground, which is formed by the two inner disks.

The object of the present invention is to provide a disk harrow with two distinct rows of colter-disks, one being in advance of the other and the rear colter-disks being so arranged as to cut the soil between the forward disks. The disks of the forward and rear line are curved or dished in opposite directions, so that a counter side strain is given to the frame. By this arrangement the lateral strain of the rear colter-disks counteracts the lateral strain of the forward colter-disks, thereby permitting forward travel of the harrow in true line.

In order to comprehend the invention, reference should be had to the accompanying drawings, wherein—

Figure 1:
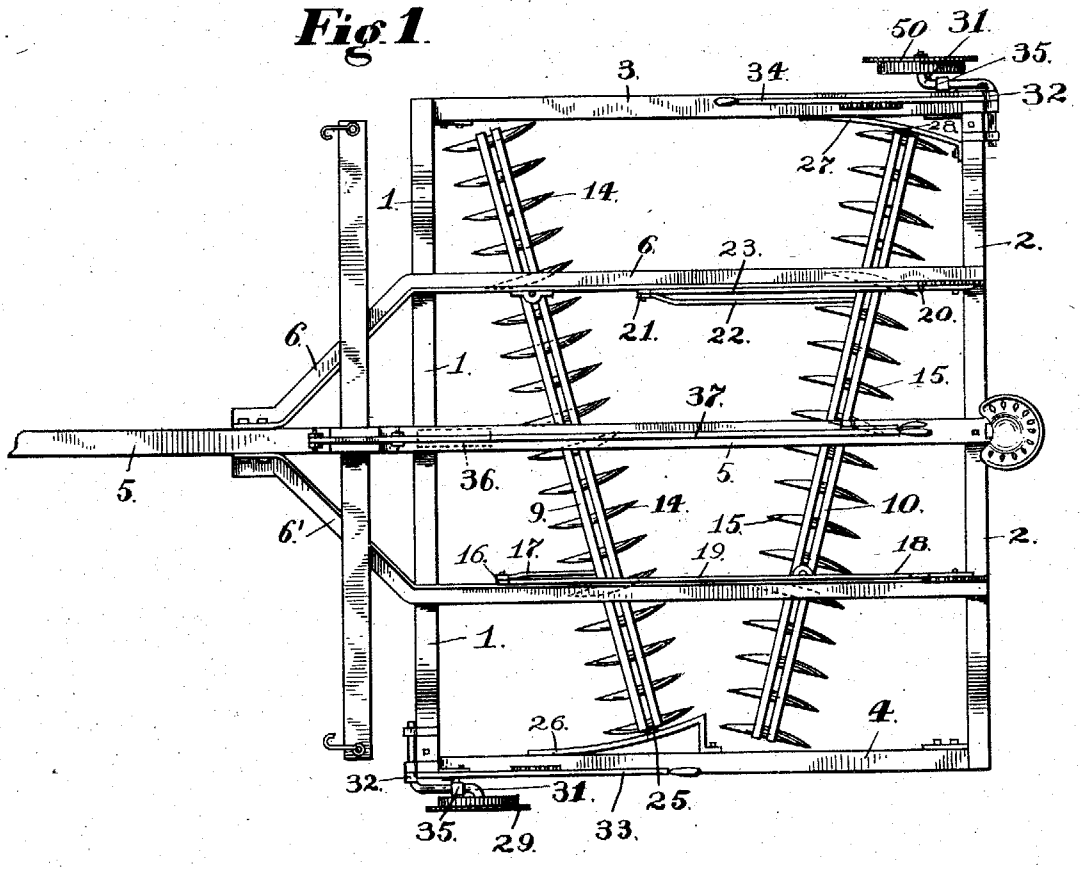
Figures 2, 3:
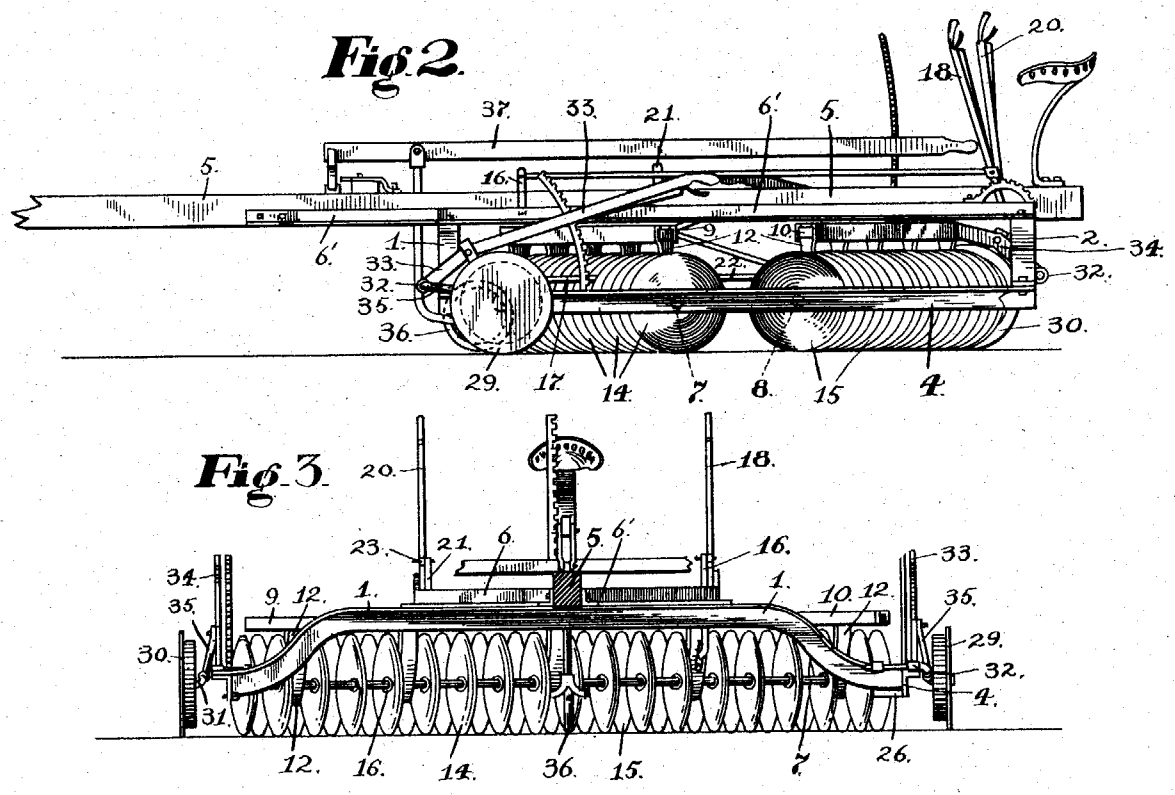

Figure 1 is a top plan view of the harrow; Fig. 2, a side view of the harrow, and Fig. 3 is an end view of the machine viewed from the front thereof.

The frame of the harrow consists of the end pieces 1 2 and the side pieces 3 4, which pieces are preferably formed of iron, and longitudinally-extending strengthening metallic beams 6 6′. The end pieces 1 2 are raised above the side pieces 3 4 in order to give clearance for the colters. To the said end pieces is bolted or otherwise secured the beam 5, which constitutes the pole of the harrow, the forward ends of the beams 6 6′ being inwardly bent, so as to embrace said pole 5.

The axles 7 8 for the colter-disks are suspended from the cross-beams 9 10, which are arranged a distance apart, so as to place one axle in advance of the other. Each cross-beam consists of two angle-plates bolted together, between which plates are secured the head end of the standards 12. These standards carry bearing-boxes, through which the axles 7 8 extend.

The forward colter-disks 14 are arranged upon the axles 7, and the rear disks 15 are arranged upon axle 8, the disks being held spaced by means of the spools 16. The rear colter-disks 15 are dished or curved in an opposite direction to that of the forward colter-disks 14, and the said rear disks are so placed as to cut the soil between the forward disks. By this arrangement a finer pulverization of the soil is obtained than possible by a single row of colter-disks.

The forward cross-beam 9 is pivoted adjacent its outer end portion to the longitudinal beam 6 of the supporting-frame, while adjacent its inner end portion it is connected to one end of the fulcrumed lever 16, attached to one side of the beam 6′ of the supporting-frame by means of the connecting-rod 17. The opposite or free end of the lever 16 is connected to the hand-lever 18 by a draw-rod 19. As thus connected the forward cross-beam may be swung into different positions through the medium of the said hand-lever 18, so as to shift the position of the forward row of colter-disks. By means of the hand-lever 20 the rear cross-beam 10 may have its position changed in accordance with the forward cross-beam. Said beam 10 is pivoted near its inner end to the longitudinal beam 6′ of the supporting-frame and adjacent its outer end connected to the fulcrumed lever 21, attached to one side of the longitudinal beam 6 of said supporting-frame by connecting-rod 22. The free end of the fulcrumed lever is attached to the hand-lever 20 by means of the draw-rod 23. By shifting the rear cross-beam the position of the rear row of colter-disks may be changed in accordance with the altered position of the forward row of colter-disks. The colter-disks are fastened to their respective axles in the usual manner—that is, by means of a nut being firmly screwed onto the end of the axle opposite the pivoted end of its cross-beam. This end of the axles I shall term the "free" end.

To the free end of the axle 7 is secured a case-hardened cap 25, which bears against the case-hardened curved plate 26 during the working of the machine. This plate is the segment of a circle having the same radius as the arc described by the movement of the axle 7. The end thrust of the said axle is taken up by this plate 26, which serves to hold the same against end movement. The plate 26 is attached inside of the outer frame at one corner thereof, as shown in the drawings. To the opposite diagonal corner of the outer frame is attached a case-hardened segment-plate 27, against which bears the case-hardened cap 28. This cap covers the nut on the free end of axle 8. Like plate 26 the plate 27 holds the axle 7 against end movement. To opposite diagonal outer corners of the outer frame the flanged colter-wheels 29 30 are secured, which wheels overcome such tendency as may exist for the harrow to work to one side during travel. These wheels are mounted on the end of journals 31, which journals work in bearing-boxes 32. By means of the levers 33 34 the position or inclination of the colter-wheels may be readily changed. Said levers control the colter-wheels through the medium of the connections 35. Below the pole of the harrow is arranged an adjusting-wheel 36, which is raised or lowered by means of the lever 37. The lower end of this wheel raises the pole and forward end of the outer frame, so as to lift the front row of colter-disks clear of the ground.

The essential feature of the present invention resides in the employment of two independent rows of colter-disks, one arranged in advance of the other, each row of colter-disks being mounted on an axle pivoted to a supporting-frame, with means connected to the axles carrying the colter-disks, so that either axle may be independently swung to vary the position thereof, the rear row of colter-disks being set to work intermediate the disks of the forward row. By this arrangement one machine gives a double harrowing to the ground, the equivalent of running a single harrow twice over the surface of the field.

The arrangement of the double row of colter-disks secures a finer pulverization of the soil than is possible by a single row of colter-disks.

Having thus described the invention, what is claimed as new, and desired to be protected by Letters Patent, is—

1. A disk harrow comprising a frame, a pair of axles suspended therefrom, the axles being pivotally connected each near one end thereof to the frame, the one at a point near one side of the frame and the other at a point near the opposite side thereof, means connected to the free end of the axles for independently changing the position thereof, a series of colter-disks secured to each axle, and colter-wheels connected to the frame at diagonally opposite corners.

2. The combination with a frame, of a pair of axles suspended therefrom one in advance of the other, said axles being pivotally connected each near one end thereof to the frame, the one at a point near one side of the frame and the other at a point near the opposite side thereof, means connected with the free end of each axle whereby the same may be swung into different positions, a series of colter-disks secured to each axle, and segment-plates attached to the frame and against which the free ends of the axles bear.

3. A disk harrow comprising a frame, a pair of axles suspended therefrom, said axles being coextensive and arranged one in advance of the other in substantially the same line of travel, the axles being pivotally connected each near one end thereof to the frame, one at a point near one side of the frame and the other at a point near the opposite side thereof, means mounted on the frame for independently operating the axles for changing the position thereof, connections between said means and the free end portion of each axle, and a series of colter-disks secured on the said axles.

4. A disk harrow comprising a frame, a pair of axles suspended therefrom, said axles being arranged one in advance of the other in substantially the same line of travel, the axles bepivotally connected each near one end thereof to the frame, the one at a point near one side of the frame and the other at a point near the opposite side thereof, hand-levers hinged to the frame, a draw-rod secured to and projecting from each hand-lever, a fulcrumed lever connection between each draw-rod and the free end portion of each axle, a series of colter-disks secured on the axles, and means for holding the hand-lever in locked position.

5. A disk harrow comprising a frame, a pair of axles suspended therefrom, said axles being arranged one in advance of the other in substantially the same line of travel, the axles being pivotally connected each near one end thereof to the frame, the one at a point near one side of the frame and the other at a point near the opposite side thereof, means mounted on the frame for independently operating the axles for changing the position thereof, connections between said means and the free end portion of each axle, a series of colter-disks secured on the said axles, and means for overcoming the side strain of the harrow.

6. A disk harrow comprising a frame, a pair of spaced cross-beams pivotally connected within the frame, each near one end thereof, the one at a point near one side of the frame and the other at a point near the opposite side thereof, standards suspended from the cross-beams, axles working in bearing-boxes carried by the standards, colter-disks carried by the axles, a pair of levers fulcrumed to opposite sides of the frame, connection between said levers and the respective axles, hand-levers mounted on the frame, draw-rod connection between the hand-levers and the respective fulcrumed levers, and means for holding the hand-levers in locked position.

7. A disk harrow comprising a frame, a pair of axles suspended therefrom, said axles being arranged one in advance of the other in substantially the same line of travel, a series of colter-disks secured to each axle, devices for pivotally connecting each axle, the axles being pivotally connected each near one end thereof to the frame, the one at a point near one side of the frame and the other at a point near the opposite side thereof, means mounted on the frame for independently operating the axles for changing the position thereof, connections between said means and the free end of each axle, and devices adjacent the free ends of the axles for taking up the end thrust of each axle.

8. A disk harrow comprising a frame, a pair of axles suspended therefrom, said axles being arranged one in advance of the other, the axles being pivotally connected each near one end thereof to the frame, the one at a point near one side of the frame and the other at a point near the opposite side thereof, hand-levers hinged to the said frame, a draw-rod secured to and projecting from each hand-lever, a fulcrumed lever connection between the draw-rods and the free end portion of each axle, a series of colter-disks secured on the axles, means for holding the hand-levers in locked position, bearings on the frame for taking up the end thrust of each axle, and means for overcoming the side strain of the harrow.

9. A disk harrow comprising a frame, a pair of axles suspended therefrom, said axles being arranged one in advance of the other, and being pivotally connected each near one end thereof to the frame, the one at a point near one side of the frame and the other at a point near the opposite side thereof, a pair of hand-levers mounted on the frame, a draw-rod secured to and projecting from each hand-lever, a fulcrumed lever connection between the draw-rods and the axles so that the axles may be independently operated, a series of colter-disks secured on the axles, means for holding the hand-levers in locked position, an adjusting-wheel for the harrow-frame, and a lever connection for operating said wheel to raise and lower the said frame.

10. The combination with a frame, of a forwardly-extended tongue centrally arranged thereon, longitudinally-extended bars secured to the forward and rear ends of the frame, the forward ends of the bars being bent inwardly and secured to the respective sides of the tongue, axles extending transversely to said bars, disks on the axles, the axles being pivotally connected each near one end thereof to said longitudinally-extended bars, the one at a point near one side of the frame and the other at a point near the opposite side of the frame, and means on said bars connected to the free ends of the axles for changing the position thereof.

11. In a disk harrow, a frame comprising front, rear and side sections, longitudinally-extended bars between the front and rear sections, a pair of axles extending transversely to the bars, one in advance of the other, the axles being pivotally connected each near one end thereof to said longitudinally-extended bars, the one at a point near one side of the frame, and the other at a point near the opposite side of the frame, and means on said bars connected to the free ends of the axles for changing the position thereof.

12. In a disk harrow, a frame comprising front, rear and side sections, longitudinally-extended bars between the front and rear sections, a pair of axles extending transversely to the bars, one in advance of the other, the axles being pivotally connected each near one end thereof to said longitudinally-extended bars, the one at a point near one side of the frame, and the other at a point near the opposite side of the frame, means on said bars connected to the free ends of the axles for changing the position thereof, and bearing-plates on said side sections, for one end of said axles.

13. The combination with a frame, of an axle suspended therefrom, said axle being pivotally connected near one end to the frame, means connected with the free end of each axle whereby the same may be swung to different positions, a series of colter-disks secured to the said axle, and a segment-plate attached to the frame and against which the free end of the axle bears.

14. A disk harrow comprising a frame, a pair of axles suspended therefrom, said axles being arranged one in advance of the other in substantially the same line of travel, the axles being pivotally connected each near one end thereof to the frame, the one at a point near one side of the frame, and the other at a point near the opposite side thereof, and means connected to the free end of the axles for independently changing the position thereof, and disks on the axles.

In witness whereof I have hereunto set my hand.

ANDERS H. KOPPERUD.

Witnesses:

NINIAN E. GREY,

JOHN S. ARMSTRONG.